United States Patent [19]
Matsko et al.

[11] Patent Number: 5,875,088
[45] Date of Patent: Feb. 23, 1999

[54] ELECTRICAL SWITCHING APPARATUS EMPLOYING INTERLOCKS FOR FIRST AND SECOND TRIP FUNCTIONS

[75] Inventors: Joseph J. Matsko, Beaver, Pa.; Robert Yanniello, Arden, N.C.; James L. Lagree, Robinson Township, Pa.

[73] Assignee: Eaton Corporation, Cleveland, Ohio

[21] Appl. No.: 24,365

[22] Filed: Feb. 17, 1998

[51] Int. Cl.$^6$ .................................................. H02H 3/00
[52] U.S. Cl. ............................................. 361/96; 361/64
[58] Field of Search ..................... 361/93–102, 62–64, 361/67–68

[56] References Cited

U.S. PATENT DOCUMENTS

| | | | |
|---|---|---|---|
| 4,428,022 | 1/1984 | Engel et al. | 361/96 |
| 4,442,472 | 4/1984 | Pang et al. | 361/96 |
| 4,751,606 | 6/1988 | Matsko et al. | 361/93 |
| 4,752,853 | 6/1988 | Matsko et al. | 361/94 |
| 4,827,369 | 5/1989 | Saletta et al. | 361/96 |
| 5,270,898 | 12/1993 | Elms et al. | 361/96 |
| 5,341,191 | 8/1994 | Crookston et al. | 335/16 |

*Primary Examiner*—Jeffrey Gaffin
*Assistant Examiner*—Michael J. Sherry
*Attorney, Agent, or Firm*—Martin J. Moran

[57] ABSTRACT

A circuit breaker includes separable contacts for movement between a closed position and an open position. An operating mechanism, which moves the separable contacts between the closed and open positions, has a closed state and an open or tripped state which corresponds to the open position. A current transformer senses electrical current flowing through the separable contacts as a sensed current. A trip mechanism employs the sensed current for tripping the operating mechanism to the tripped position to move the separable contacts to the open position. The trip mechanism includes a microprocessor which generates short delay and ground fault trip functions of electrical current and time. The microprocessor inputs a first interlock signal from a downstream electrical switching device which generates the first interlock signal with a first value when current through the downstream device exceeds a predetermined value and with a second value otherwise. The microprocessor generates and outputs a second interlock signal to an upstream electrical switching device in response to both of the first and second trip functions. The trip mechanism selectively trips the operating mechanism as a function of the first interlock signal, the first trip function, and the second trip function.

19 Claims, 5 Drawing Sheets

ELECTRICAL SWITCHING APPARATUS EMPLOYING INTERLOCKS FOR FIRST AND SECOND TRIP FUNCTIONS

BACKGROUND OF THE INVENTION

1. Field of the Invention

This invention is directed to an electrical switching apparatus and, more particularly, to a circuit interrupter, such as a circuit breaker, including interlocks with another circuit breaker.

2. Background Information

Electrical switching apparatus include, for example, circuit switching devices and circuit interrupters such as circuit breakers, contactors, motor starters, motor controllers and other load controllers. Circuit breakers are generally old and well known in the art. Examples of circuit breakers are disclosed in U.S. Pat. Nos. 4,751,606; and 5,341,191. Such circuit breakers are used to protect electrical circuitry from damage due to an overcurrent condition, such as an overload condition or a relatively high level short circuit or fault condition.

Molded case circuit breakers include a pair of separable contacts per phase which may be operated either manually by way of a handle disposed on the outside of the case or automatically in response to an overcurrent condition. Typically, such circuit breakers include an operating mechanism, which is designed to rapidly open and close the separable contacts, and a trip mechanism, which senses overcurrent conditions in an automatic mode of operation. Upon sensing an overcurrent condition, the trip mechanism trips the operating mechanism to a trip state which moves the separable contacts to their open position.

In coordinating the delay times and performance characteristics of the circuit interrupters associated with an electrical distribution system, a time-trip curve of the desired current response characteristics of the circuit interrupter over time may be employed. For example, in the time-trip curve, the current factor is shown on the horizontal axis and the time factor is shown on the vertical axis. Typically, the time-trip curve includes various types of overcurrent trip conditions, such as a long delay trip, a short delay trip, an instantaneous trip, or a ground fault trip. Modern trip mechanisms often employ a microprocessor to detect these overcurrent trip conditions.

The long delay protection feature generally follows an $I^2t$ sloped portion of the log-log time-trip curve. The long delay feature is sometimes referred to as a thermal trip feature since it most closely resembles a thermal-type tripping operation typically offered by predecessor non-electronic circuit interrupters. This feature consists of both a selectable long delay current pickup factor (e.g., LDPU factor) and a long delay time factor (e.g., LDT factor). The LDPU factor selectively adjusts the time-trip curve along the horizontal or current axis and the LDT factor selectively adjusts the time-trip curve along the vertical or time axis. In this manner, the limits of the long delay protection feature provide a first trip-curve portion which is adjustable in both axes. Typically, the long delay protection feature provides an $I^2t$ trip characteristic for currents exceeding the LDPU factor wherein, at higher levels of current in excess of the LDPU factor, a shorter LDT will result, although other trip characteristics such as $I^4t$ may be employed.

At higher levels of current flowing through the electrical circuit protected by the circuit interrupter, it is necessary that the circuit interrupter provide a more rapid response than that provided by the long delay protection feature. This more rapid response is commonly referred to as a short delay protection feature and is characterized by a portion of the trip-curve designated as the short delay trip-curve portion. The short delay protection feature may be selectively configured in various manners such as a fixed time response or an $I^2t$ response.

The current level at which a short delay trip condition is initiated is commonly referred to as a short delay pickup factor (e.g., SDPU factor). Under certain conditions, it is necessary that the short delay trip condition be initiated immediately upon sensing a current value in excess of the SDPU factor. Other conditions utilize a fixed time short delay trip-curve portion and still other conditions arise where it is necessary to impose an $I^2t$ trip characteristic trip curve portion.

The next level of protection offered by the circuit interrupter is an instantaneous trip-curve portion which corresponds to an instantaneous protection feature. At very high levels of overcurrent through the electrical circuit, it is necessary that the circuit interrupter initiate a trip condition as rapidly as possible (e.g., within 20 milliseconds or less of sensing the faulted condition). This overcurrent level is selectively adjustable within the instantaneous trip-curve portion of the time-trip curve.

Another type of protection is the ground fault protection feature which provides the same types of protection as does the short delay protection feature, although the ground fault pick-up level is more sensitive than the short delay pick-up level. The ground fault protection feature provides that, should a certain level of current be flowing through a ground path associated with the electrical circuit in excess of a ground fault pickup factor (e.g., a GFPU factor), a ground fault trip condition is initiated. The GFPU factor is selectively adjustable in a ground fault trip-curve which typically employs a fixed time or $I^2t$ ground fault protection. Under certain conditions, it is necessary to wait a selectively adjustable period of time, designated as the ground fault time factor (e.g., GFT factor), before initiating a ground fault trip condition.

In a typical electric power distribution system, a main bus provides power to a number of additional buses which, in turn, energize a plurality of distribution circuits. Often, power transformers step down the voltage at various points in the distribution system. Typically, overcurrent protection devices are provided in the main bus and in at least some, if not all, of the other branches of the distribution system. Each of the overcurrent protection devices has its own overcurrent/time trip characteristic for responding to faults in the distribution system. Typically, these overcurrent/time trip characteristics of the various overcurrent protection devices are coordinated through a hierarchical arrangement in order that only the closest protection device above the fault trips to minimize the interruption to service in the distribution system.

In some installations, zone interlocks between the overcurrent protection devices are employed. In such an arrangement, if a lower order overcurrent protective device of the hierarchy sees an overload current, it sends an interlock signal to the next higher order device to block generation of a trip signal by the latter and to give the former time to react. This permits adjacent overcurrent protective devices in the hierarchy to have their overcurrent/time trip characteristics set closer together, while assuring that the lower order device will trip first if conditions warrant.

U.S. Pat. No. 4,827,369 discloses the use of zone interlocks between upstream and downstream circuit interrupters to adjust the timing of short delay and ground fault protection in the upstream devices. If a short delay current threshold is exceeded in the downstream device, it sends a short delay zone interlock signal to the upstream device to indicate that a short delay fault condition has been identified. If the short delay current threshold is exceeded in the upstream device, and the short delay zone interlock signal is not received from the downstream device, then a short delay trip is rapidly initiated by the upstream device on the second consecutive recognition of that threshold being exceeded (e.g., to prevent the occurrence of a false initiation of the short delay trip condition resulting from a possible late signal from a downstream device due to possible asynchronous conditions). Otherwise, if the short delay current threshold is exceeded in the upstream device, and the short delay zone interlock signal is received, then a time delayed portion (e.g., either an $I^2t$ or fixed time type) of the short delay routine is executed by the upstream device.

As further disclosed in U.S. Pat. No. 4,827,369, ground fault protection is implemented in a similar manner as the short delay protection, with each of the upstream and downstream devices inputting an input ground fault zone interlock signal and outputting an output ground fault zone interlock signal. For both the ground fault protection and the short delay protection, two separate input interlock signals indicate whether respective ground fault and short delay conditions were identified by a downstream circuit interrupter, and two separate output interlock signals indicate to an upstream circuit interrupter whether respective ground fault and short delay conditions were identified by the intermediate circuit interrupter.

It is also known to employ a separate input interlock signal to indicate whether a long delay condition was identified by a downstream circuit interrupter, and a separate output interlock signal to indicate to an upstream circuit interrupter whether a long delay condition was identified by the intermediate circuit interrupter.

However, there is room for improvement in zone interlocks for electrical switching apparatus.

SUMMARY OF THE INVENTION

This need and others are satisfied by the invention, which is directed to an electrical switching apparatus. The apparatus advantageously employs a single interlock interface for both first and second trip functions, such as ground fault protection and short delay protection. The apparatus inputs a single interlock signal for both trip functions from a downstream electrical switching device, and outputs a single interlock signal for these trip functions to an upstream electrical switching device. In this manner, wiring between the adjacent electrical switching devices is reduced.

The trip means of the apparatus has means for generating a first trip function of electrical current and time, and means for generating a second trip function of electrical current and time. A means inputs a first interlock signal from the downstream electrical switching device. A means generates and outputs a second interlock signal to the upstream electrical switching device in response to both the first and second trip functions. A means selectively trips the operating means as a function of the first interlock signal, the first trip function, and the second trip function.

As one aspect of the invention, an electrical switching apparatus comprises separable contact means for movement between a closed position and an open position. An operating means moves the separable contact means between the closed position and the open position thereof and has a first state and a second state which corresponds to the open position of the separable contact means. A means senses electrical current flowing through the separable contact means as a sensed current. A trip means employs the sensed current for tripping the operating means to the second state thereof to move the separable contact means to the open position thereof. The trip means includes means for generating a first trip function of electrical current and time, and means for generating a second trip function of electrical current and time. A means inputs the first interlock signal from a downstream electrical switching device which has means for generating the first interlock signal with a first value when current through the downstream device exceeds a predetermined value and with a second value otherwise. A means generates and outputs a second interlock signal to an upstream electrical switching device in response to both of the first and second trip functions. A means selectively trips the operating means as a function of the first interlock signal, the first trip function, and the second trip function.

Preferably, the electrical current includes a ground current and a phase current, and the means for sensing includes means for sensing the ground current as a sensed ground current, and means for sensing the phase current as a sensed phase current. The means for generating the first trip function employs the sensed ground current to generate the first trip function as a ground fault trip function, and the means for generating the second trip function employs the sensed phase current to generate the second trip function as a short delay trip function.

As a further refinement, the electrical current includes at least one of a ground fault current and a phase fault current. The ground fault trip function employs a ground fault magnitude of electrical current and a first time period, and the short delay trip function employs a short delay magnitude of electrical current and a second time period. The means for generating and outputting the second interlock signal includes means for asserting that signal: (a) when the ground fault current exceeds the ground fault magnitude, or (b) when the phase fault current exceeds the short delay fault magnitude.

As another aspect of the invention, a circuit breaker comprises separable contact means for movement between a closed position and an open position. An operating means moves the separable contact means between the closed position and the open position thereof and has a first state and a second state which corresponds to the open position of the separable contact means. A means senses electrical current flowing through the separable contact means as a sensed current. A trip means employs the sensed current for tripping the operating means to the second state thereof to move the separable contact means to the open position thereof. The trip means includes means for generating a first trip function employing a first magnitude of electrical current and a first time period, and means for generating a second trip function employing a second magnitude of electrical current and a second time period. A means inputs the first interlock signal from a downstream electrical switching device which has means for generating the first interlock signal with a first value when current through the downstream device exceeds a predetermined value and with a second value otherwise. A means generates and outputs a second interlock signal to an upstream electrical switching device in response to both of the first and second trip functions. A means selectively trips the operating means, when the first interlock signal has the first value, as a function of the first magnitude and the first time period of the first trip function, and as a function of the second magnitude and the second time period of the second trip function. A means selectively trips the operating means, when the first interlock signal has the second value, as a function of the first magnitude of the first trip function or the second magnitude of the second trip function.

As a further aspect of the invention, a system of electrical switching apparatus comprises a first electrical switching apparatus and at least one second electrical switching apparatus. Each of the electrical switching apparatus comprises separable contact means for movement between a closed position and an open position, operating means for moving the separable contact means between the closed position and the open position thereof having a first state and a second state which corresponds to the open position of the separable contact means, means for sensing electrical current flowing through the separable contact means as a sensed current, and trip means employing the sensed current for tripping the operating means to the second state thereof to move the separable contact means to the open position thereof. The trip means includes means for generating a first trip function of electrical current and time, and means for generating a second trip function of electrical current and time. The trip means of a downstream one of the first and second electrical switching apparatus further includes means for generating a first interlock signal with a first value when current through the downstream one of the electrical switching apparatus exceeds a predetermined value and with a second value otherwise. The trip means of an upstream one of the first and second electrical switching apparatus further includes means for inputting the first interlock signal from the downstream one of the first and second electrical switching apparatus. A means selectively trips the operating means of the upstream one of the first and second electrical switching apparatus as a function of the first interlock signal of the downstream one of the first and second electrical switching apparatus, and both of the first and second trip functions of the upstream one of the first and second electrical switching apparatus.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
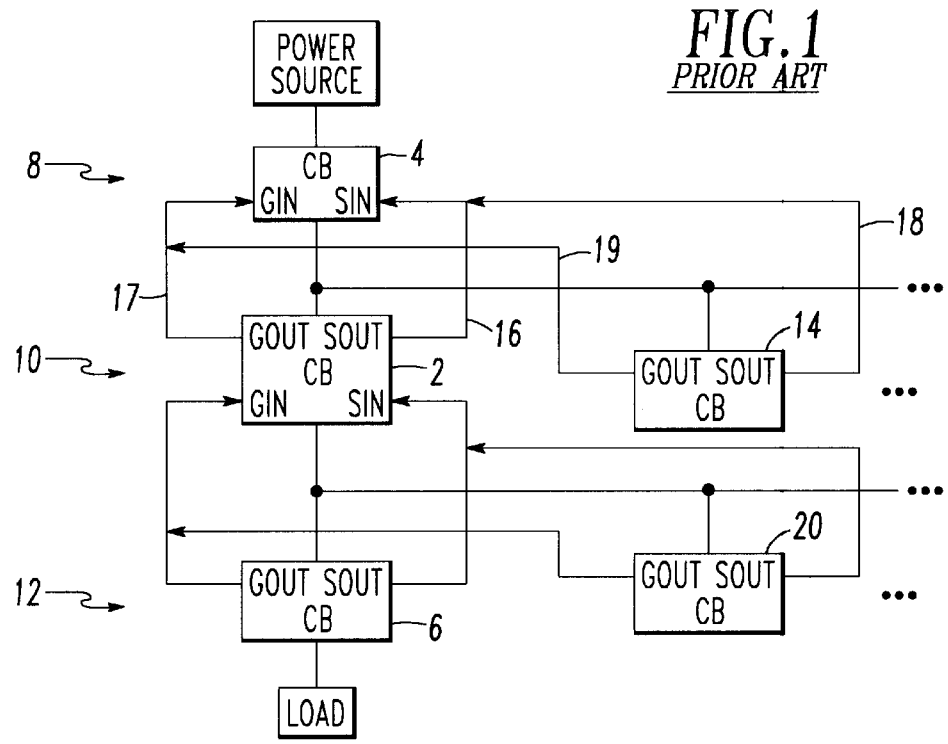
FIG. 1 is a block diagram of intermediate circuit breakers, an upstream circuit breaker and downstream circuit breakers including separate interlock interfaces for ground fault protection and short delay protection.

FIG. 1 is a block diagram of an intermediate circuit breaker (CB) 2 interfacing an upstream circuit breaker (CB) 4 and a downstream circuit breaker (CB) 6 including separate interlock interfaces for ground fault protection and short delay protection. Zone interlocks are employed to provide coordination among three levels 8,10,12 of circuit breakers in the hierarchy. For example, at level 10, the trip units (not shown) of CBs 2 and 14 generate zone interlock signals (e.g., SOUT or GOUT) when they see a fault. These output zone interlock signals are transmitted to an input zone interlock signal (e.g., SIN or GIN, respectively) of the trip unit (not shown) of CB 4 above them in the hierarchy through leads 16,18 and 17,19, respectively. The zone interlock signals prevent tripping of CB 4, giving CB 2 or 14 time to respond to a fault below it. This zone interlock scheme also allows the protection curves for the trip units (not shown) of the lower CBs 6 and 20 to be closer to the protection curve for the trip unit of CB 2.

Figure 2:
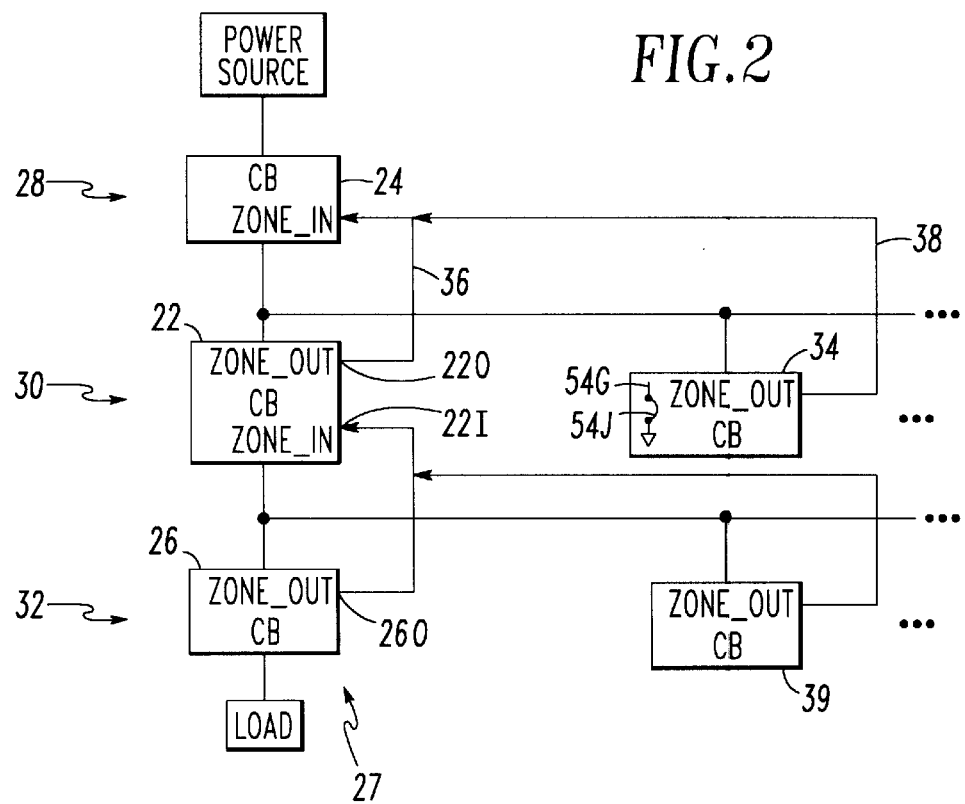
FIG. 2 is a block diagram of intermediate circuit breakers, an upstream circuit breaker and downstream circuit breakers including a single interlock interface for ground fault protection and short delay protection in accordance with the invention.

FIG. 2 is a block diagram of an intermediate circuit breaker (CB) 22 interfacing an upstream circuit breaker (CB) 24 and a downstream circuit breaker (CB) 26 including a single interlock interface for ground fault protection and short delay protection. CBs 24,22,26 form a system 27 of circuit breakers. Zone interlocks are employed to provide coordination among three levels 28,30,32 of circuit breakers in the hierarchy. For example, at level 30, the trip units (not shown) of CBs 22 and 34 each generate a zone interlock signal (i.e., ZONE_OUT) when they see a fault. These output zone interlock signals are transmitted to an input zone interlock signal (i.e., ZONE_IN) of the trip unit (not shown) of CB 24 above them in the hierarchy through leads 36 and 38, respectively. The zone interlock signals prevent tripping of CB 24, giving CB 22 or 34 time to respond to a fault below it. This zone interlock scheme also allows the protection curves for the trip units (not shown) of the lower CBs 26 and 39 to be closer to the protection curve for the trip unit of CB 22.

Zone interlocking is provided on both phase and ground protection, if enabled. The ground and short delay interlocking functions are combined on one common set of connections (e.g., 36,38). In this manner, wiring between the adjacent CBs 22-24 and 34-24 is reduced. For example, instead of employing a ground fault interlock (GOUT), a short delay interlock (SOUT) and a ground connection (not shown) between adjacent circuit breakers as shown in FIG. 1, a combined ground fault/short delay interlock (ZONE_OUT) and a ground connection (not shown) are employed as shown in FIG. 2. In the exemplary embodiment, the zone interlock output signal ZONE_OUT is enabled when the fault: (1) exceeds the ground setting; or (2) is greater than two times the rated current value of the electrical current of the CB 22.

The trip unit (not shown) of downstream CB 26 includes a circuit for generating the zone interlock output signal ZONE_OUT at interlock output terminal 26O with an exemplary true value, when current through the downstream CB 26 exceeds a predetermined value, and with an exemplary false value otherwise. The trip unit (not shown) of intermediate CB 22 includes a circuit for inputting zone interlock input signal ZONE_IN at interlock input terminal 22I from downstream CB 26. This trip unit also includes a circuit for selectively tripping the operating mechanism 46 (as shown in FIG. 3) of CB 22 as a function of the zone interlock output signal ZONE_OUT of downstream CB 26, and the ground fault and short delay trip functions of CB 22.

As discussed below in connection with FIGS. 6 and 7, the trip unit (not shown in FIG. 2) of intermediate CB 22 inputs the zone interlock input signal ZONE_IN from the ZONE_OUT signal of downstream CB 26. In turn, the CB 22 generates and outputs at terminal 220 the zone interlock output signal ZONE__OUT to upstream CB 24 in response to both of the ground fault and short delay trip functions of the intermediate CB 22.

Figure 3:
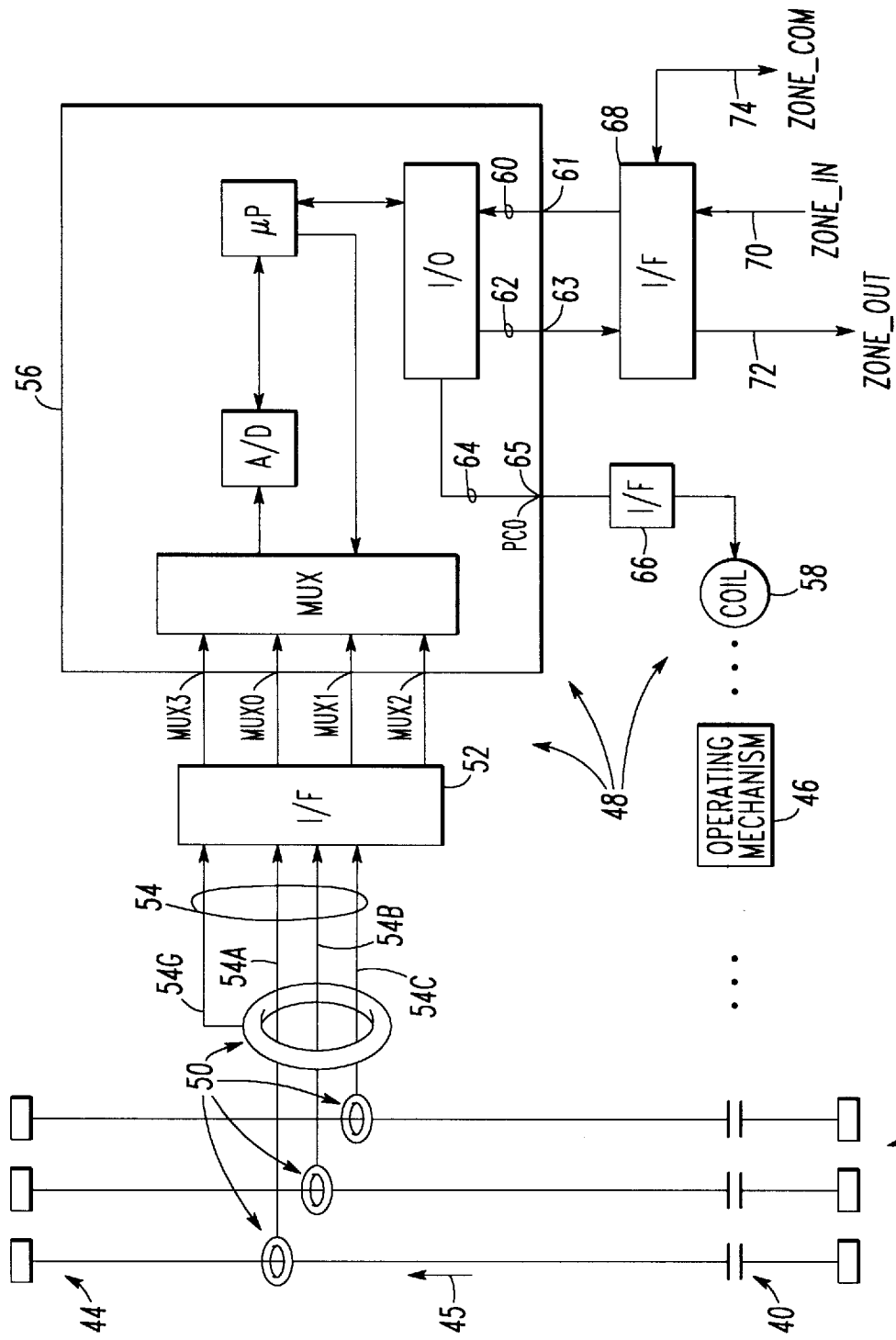
FIG. 3 is a functional block diagram of the intermediate circuit breaker of FIG. 2.

FIG. 3 is a functional block diagram of intermediate CB 22 of FIG. 2. A typical example of a circuit breaker is disclosed in U.S. Pat. No. 4,752,853, which is incorporated by reference herein. The circuit breaker 22 includes one or more separable contacts 40 electrically interconnected between line terminals 42 and load terminals 44 for movement between a closed position (not shown) and an open position (as shown in FIG. 3) in order to switch one or more electrical currents, such as current 45, flowing through the separable contacts 40 between the terminals 42,44.

The circuit breaker 22 also includes an operating mechanism 46 for moving the separable contacts 40 between the closed and open positions, and a trip circuit 48. The trip circuit 48 interfaces sensors, such as current transformers (CTs) 50, for sensing the line and ground electrical currents. The trip circuit 48 includes a suitable interface (I/F) 52 for receiving the sensed current signals 54 from the CTs 50; a microcomputer 56, such as a SURE CHIP PLUS™; and a trip coil 58 controlled by the microcomputer 56. The sensed current signals 54 include a sensed ground current 54G and sensed phase currents 54A,54B,54C, which may represent both normal and fault currents in the electrical circuit. In the event that the ground fault trip function is not employed, the sensor of CTs 50 for the signal 54G is removed and jumper or switch 54J is employed to ground signal 54G as shown with CB 34 of FIG. 2. An example of the exemplary SURE CHIP PLUS™ microcomputer 56 is disclosed in U.S. Pat. No. 5,270,898, which is incorporated by reference herein.

The microcomputer 56 employs a multiplexer (MUX) to select the sensed current signals 54 from I/F 52; an analog-to-digital (A/D) converter to convert the analog current signals 54 to corresponding digital values; a microprocessor ($\mu$P) to receive the digital values from the A/D; and a digital input/output circuit (I/O) to input various input signals, such as interlock input signal 60 at input port 61, and to output various Output signals, such as interlock Output signal 62 at output port 63 and trip signal 64 at output port 65.

The operating mechanism 46 has a first state (e.g., closed) and a second state (e.g., open or tripped) which corresponds to the open position of the separable contacts 40. The CTs 50 sense the electrical current, such as current 45, flowing through the separable contacts 40. The $\mu$P of the microcomputer 56 employs the digital values of the sensed current signals 54 from the A/D to generate the trip signal 64 at output 65 for tripping the operating mechanism 46 through interface (I/F) 66 and trip coil 58 to the tripped state to move the separable contacts 40 to the open position.

The digital input/output circuit (I/O) for microcomputer 56 is interconnected with interface (I/F) 68 which inputs ZONE__IN signal 70 for presentation to the I/O at input port 61, and which outputs ZONE__OUT signal 72 from the I/O at output port 63. The ZONE__IN signal 70 and ZONE__OUT signal 72 are referenced to the ZONE__COM ground signal 74, which establishes a common ground for the interlock signals 70,72.

Figure 4:
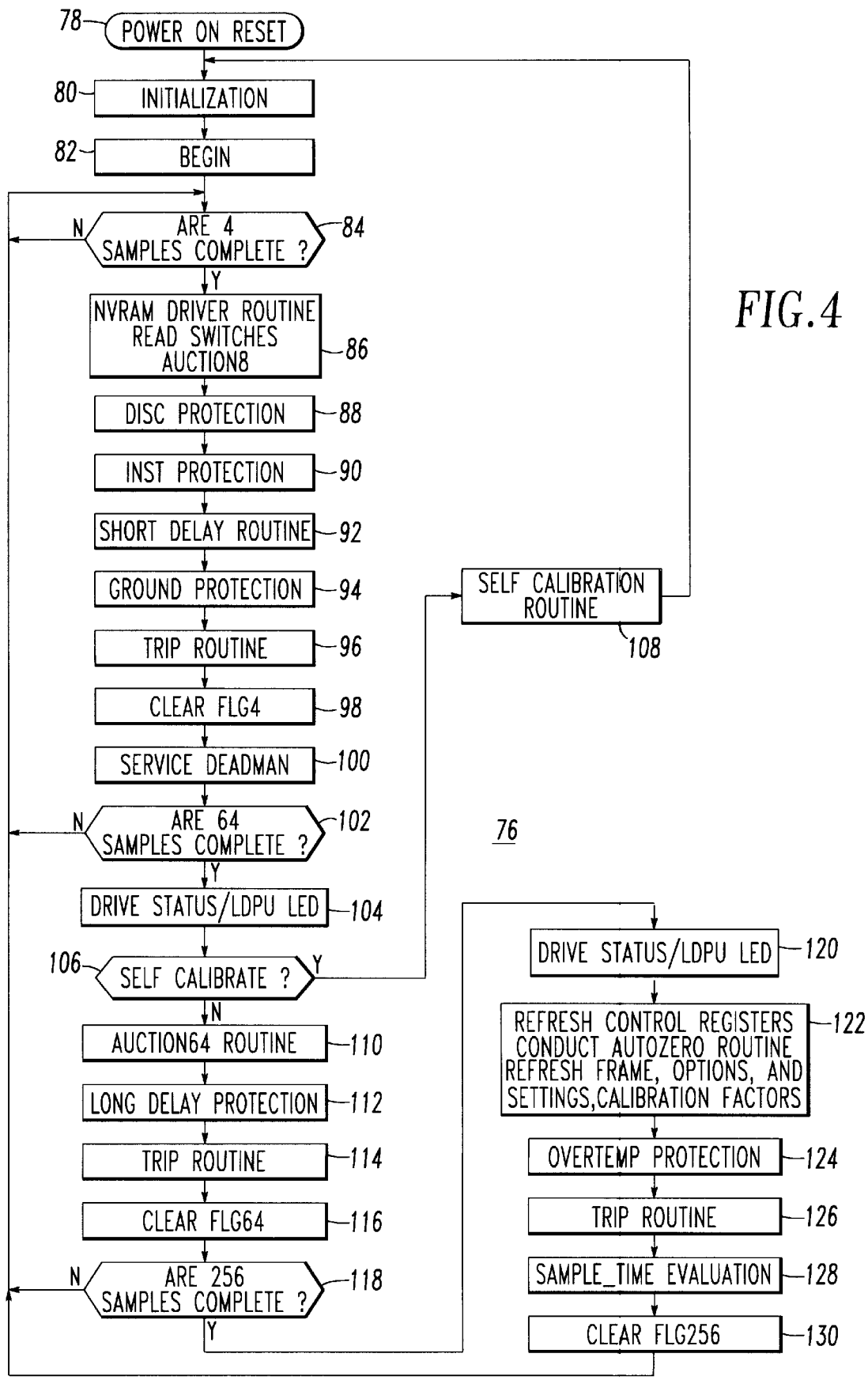
FIG. 4 is a main loop flow chart of firmware for the circuit breaker of FIG. 3.

Referring to FIG. 4, an exemplary main loop routine 76 is executed by the $\mu$P of microcomputer 56 of FIG. 3. After a power on reset at 78, initialization is conducted at 80. Next, at 82, the principal portion of routine 76 begins. At 84, a flag (FLG4) is tested to determine if four current samples are completed. If not, then step 84 is repeated. Otherwise, at 86, any data that needs written to non-volatile random access memory (NVRAM) (not shown) is written at this time, switch settings (not shown) are read, and an auction8 routine auctioneers the highest sum of eight squared current values for the phases. Next, at 88 and 90, discrete and instantaneous protection routines, respectively, are executed. These routines compare the highest sum of squared current values for the phases with the corresponding instantaneous setpoint value. Then, at 92 and 94, short delay and ground protection routines, respectively, are executed. The short delay routine 92 compares the highest sum of squared current values for the phases with the short delay setpoint and, if exceeded, a pickup occurs and a tally value is added to a short time tally (STALLY) value which is, in turn, compared with the short time setting and, if greater, a short flag is set—for eventual tripping. A similar set of sequences occurs for the ground fault routine 94. At 96, a trip routine is executed which generates the trip signal 64 at output 65 of FIG. 3 in the event any trip conditions were detected at steps 88,90,92,94. Then, at 98, the flag (FLG4) tested at 84 is cleared before a deadman timer (not shown) for microcomputer 56 is updated at 100.

Next, at 102, a flag (FLG64) is tested to determine if 64 current samples are completed. If not, then step 84 is repeated. Otherwise, at 104, LEDs (not shown) are updated in order to provide LDPU or long delay, short delay, instantaneous and ground fault trip indicators (not shown) by driving a latch (not shown) external to the $\mu$P of microcomputer 56. Next, at 106, if self calibration is selected by a jumper (not shown) at the factory, then a self calibration routine, at 108, calculates calibration values for each phase and ground and stores these in NVRAM (not shown). The calibration procedure employs precision current sources (three phases and ground) and is automatically performed by the trip circuit 48. After the self calibration routine is executed at 108, the initialization is repeated at 80. Otherwise, at 110 and 112, auction64 and long delay protection routines, respectively, are executed. These routines auctioneer the highest sum of 64 squared current values for the phases and use this value for long delay pickup and long time tally developed values. At 114, a trip routine is executed which generates the trip signal 64 at output 65 of FIG. 3 in the event any trip flag conditions were detected at step 112. Then, at 116, the flag (FLG64) tested at 102 is cleared.

Next, at 118, a flag (FLG256) is tested to determine if 256 current samples are completed. If not, then step 84 is repeated. Otherwise, at 120, LEDs are updated as at 104. Then, at 122 and 124, refresh and over-temperature protection routines, respectively, are executed. These routines refresh key protection parameters such as switch settings, which correlate to the temperature of microcomputer 56; calibration values; and the internal diode voltage of microcomputer 56. At 126, a trip routine is executed which generates the trip signal 64 at output 65 of FIG. 3 in the event any trip conditions were detected at step 124. At 128, a sample__time evaluation routine is executed. This routine automatically selects the sampling interval for either a 50 Hz or 60 Hz sampling schedule. Then, at 130, the flag (FLG256) tested at 118 is cleared, after which step 84 is repeated.

Figure 5:
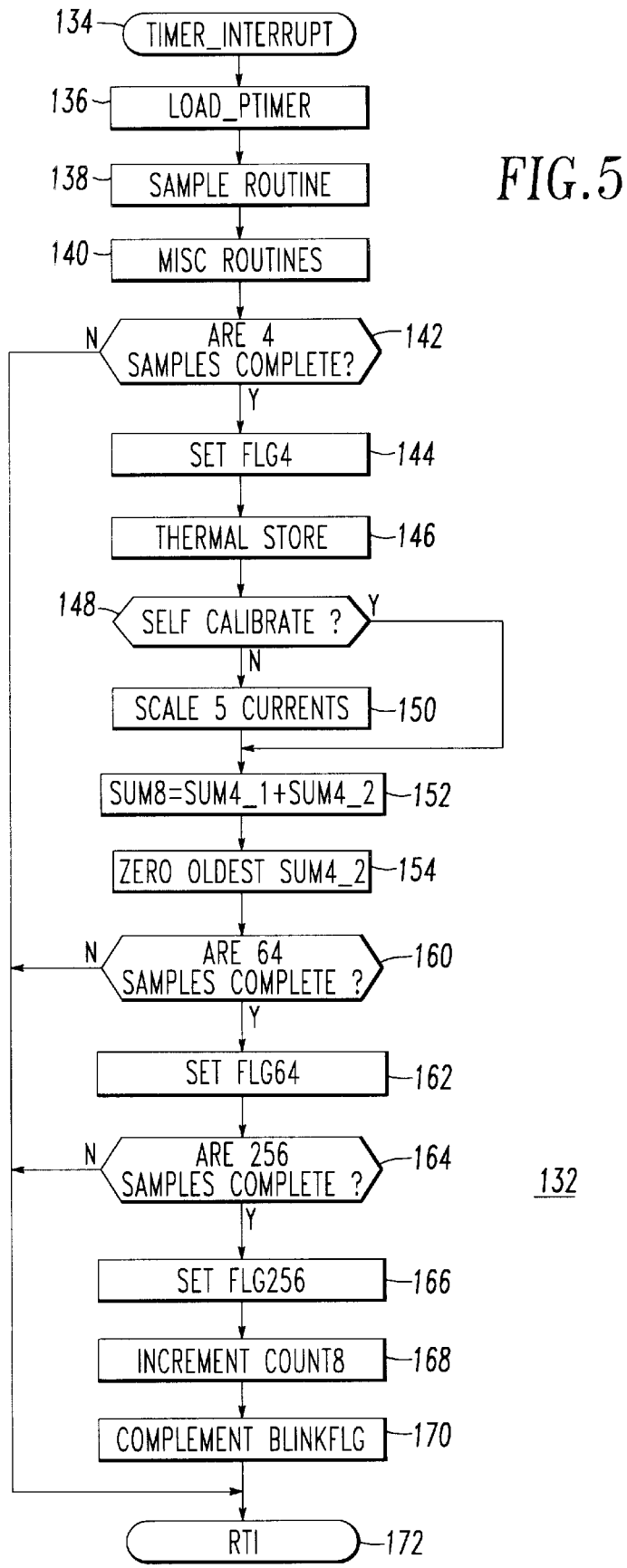
FIG. 5 is an interrupt routine flow chart of firmware for the circuit breaker of FIG. 3.

Referring to FIG. 5, an exemplary interrupt routine 132 is executed by the $\mu$P of microcomputer 56 of FIG. 3. In response to a periodic timer interrupt of the microcomputer 56 at 134, a load__ptimer routine is executed at 136. This routine loads an internal timer of microcomputer 56 with a value per a predefined schedule that will provide the next time interrupt. Next, at 138, the sensed current signals 54 from I/F 52 at MUX0–MUX3 of FIG. 3 are sampled. At 140, miscellaneous routines are executed which read the interlock input signal 60 at input port 61 of FIG. 3 to obtain the value of the ZONE_IN signal 70, and increment a counter (COUNT256) which has the count for the sample routine 138.

Next, at 142, if a multiple of four current samples has not been obtained, as determined from the value of the counter (COUNT256) of step 140, then a return from interrupt (RTI) is executed at 172. Otherwise, at 144, the flag FLG4 is set. At 146, a thermal store routine is executed which reads a thermal memory capacitor (not shown) and digitally scales its value and stores it in memory. At 148, if self calibration (as discussed above in connection with step 106 of FIG. 4) is not selected, then five (i.e., three phase currents and one ground current, as shown in FIG. 3, plus one neutral current (not shown)) current samples are scaled at 150 before step 152 is executed. Otherwise, if self calibration is selected at 148, then execution resumes with 152 which, for each of the five currents, a sum (SUM8) of the last eight current samples is determined from the sum (SUM4_1) of the latest four current samples plus the sum (SUM4_2) of the previous four current samples. Then, at 154, the oldest sum (SUM4_2) of the previous four current samples is zeroed.

Next, at 160, if a multiple of 64 current samples have not been obtained, as determined from the value of the counter (COUNT256) of step 140, then a return from interrupt (RTI) is executed at 172. Otherwise, at 162, the flag FLG64 is set. At 164, if a multiple of 256 current samples have not been obtained, as determined from the value of the counter (COUNT256) of step 140, then a return from interrupt (RTI) is executed at 172. Otherwise, at 166, the flag FLG256 is set. At 168, a counter COUNT8 is incremented (for use by units with a multiplexed display (not shown)) after which, at 170, a flag (BLINKFLG), which is used to control a status LED (not shown), is complemented. Finally, at 172, the return from interrupt (RTI) is executed.

Figure 6:
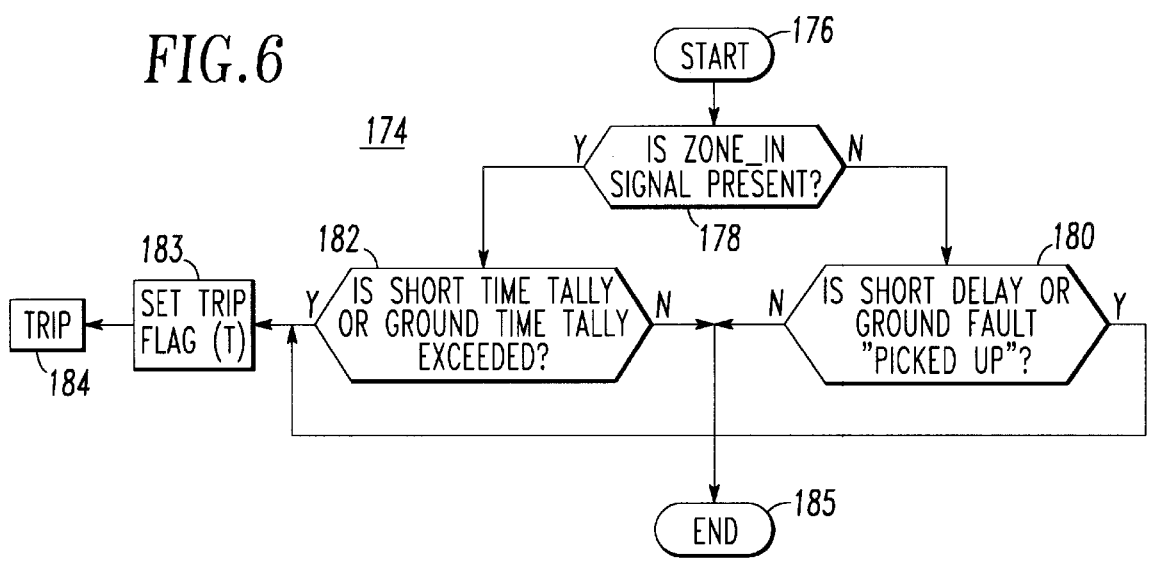
FIG. 6 is flow chart of firmware for processing the ZONE_IN signal of FIG. 3.

FIG. 6 is flow chart of a routine 174 for processing the ZONE_IN signal 70 of FIG. 3 which is read at step 140 of routine 132 of FIG. 5. Routine 174 is part of the short delay routine 92 and ground protection routine 94 of FIG. 4. After starting at 176, it is determined whether the ZONE_IN signal 70 is present at 178. If not, then it is determined whether a short delay fault or a ground fault is "picked up" at 180. The short delay fault and the ground fault are "picked up" in a manner similar to that set forth in U.S. Pat. No. 4,752,853.

Squared current summations for the phase current samples (i.e., A8SUM, B8SUM, C8SUM) are determined and the highest (i.e., MAXI$^2$) of those squared current summations is determined. If the sensed phase current, as represented by the highest squared current summation MAXI$^2$, is greater than a short delay pick up (i.e., the SDPU value), then flag T is set at 183 and then, in turn, the trip is initiated at 184. To determine that a ground fault is "picked up," whenever the sensed ground current, as represented by the summation of ground current samples (i.e., G8SUM), is greater than a ground fault pick up (GFPU) value, then the trip is initiated at 183–184. In this manner, the trip circuit 48 of FIG. 3 trips immediately when there is no ZONE_IN interlock input signal 70 and either the ground or the short delay fault pickup setting level has been exceeded. Preferably, step 180 employs a counter such that there must be two consecutive recognitions for these faults to be "picked up". In this manner, the possibility of a false trip initiation is reduced.

Otherwise, if the ZONE_IN signal 70 is present at 178, then at 182, if either the ground or the short delay fault pickup setting level has been exceeded, then it is determined whether a short time tally (STALLY) or a ground time tally (GTALLY) is exceeded. If so, then a trip is initiated at 183–184. Otherwise, the ZONE_IN interlock input signal 70 is disregarded if it is present at step 178 and neither the ground nor the short delay fault pickup setting level has been exceeded. In this manner, the trip circuit 48 of FIG. 3 provides a normal time delay before tripping when the ZONE_IN interlock input signal 70 is present and the ground or short delay fault pickup setting level has been exceeded. Hence, the operating mechanism 46 is tripped either when the sensed ground current exceeds the ground fault pickup magnitude and the time period of the ground fault trip function is exceeded, or when the sensed phase current exceeds the short delay fault pickup magnitude and the time period of the short delay trip function is exceeded.

The short time tally STALLY and ground time tally GTALLY are calculated and compared with predetermined short delay and ground fault limit settings, respectively, in a manner similar to that set forth in U.S. Pat. No. 4,752,853. In this manner, for I$^2$t short delay response, the highest squared current summation MAXI$^2$ is added to the short time tally STALLY. On the other hand, for fixed time short delay response, a constant, such as 8PU$^2$, is added to the short time tally STALLY. Similarly, for I$^2$t ground response, the summation of the previous four ground current samples (i.e., G4SUM) is added to the ground time tally GTALLY. Otherwise, for fixed time ground response, a constant, such as 0.625PU$^2$, is added to the ground time tally GTALLY.

On the other hand, if the short time tally STALLY and ground time tally GTALLY are not exceeded at 182, then the routine 174 ends at 185.

Figure 7:
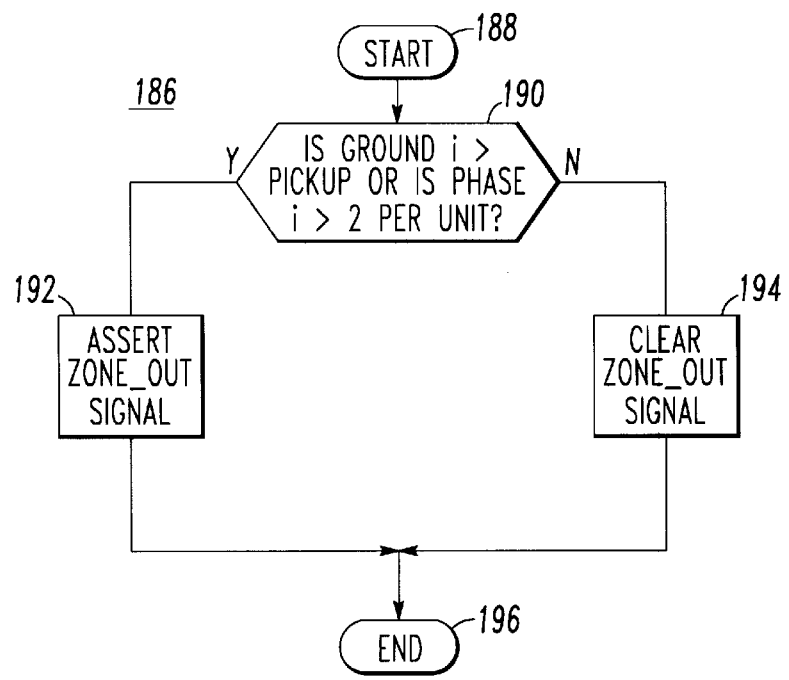
FIG. 7 is flow chart of firmware for outputting the ZONE_OUT signal of FIG. 3.

FIG. 7 is flow chart of a routine 186 for outputting the ZONE_OUT signal 72 through interlock output signal 62 at output port 63 and I/F 68 of FIG. 3. At 190, if the summation of the previous four ground current samples (i.e., G4SUM) is greater than the ground fault pick up (i.e., GFPU) value, or if the highest squared current summation MAXI$^2$ is greater than twice the short delay pick up (i.e., SDPU) value, then at 192 the ZONE_OUT signal 72 is asserted by setting interlock output signal 62. Otherwise, if the test at 190 is not met, then at 194 the ZONE_OUT signal 72 is retracted by clearing the interlock output signal 62. Although an exemplary threshold of twice the short delay pick up (i.e., SDPU) value is employed for the short delay response, it will be appreciated that a wide range of settings may be employed (e.g., without limitation, the short delay pick up (i.e., SDPU) value and various multiples thereof). Finally, after either 192 or 194, routine 186 ends at 196.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electrical switching apparatus for connection with at least one of an upstream electrical switching device and a downstream electrical switching device having means for generating a first interlock signal with a first value when current through the downstream device exceeds a predetermined value and with a second value otherwise, said electrical switching apparatus comprising:

separable contact means for movement between a closed position and an open position;

operating means for moving said separable contact means between the closed position and the open position thereof, said operating means having a first state and a second state which corresponds to the open position of said separable contact means;

means for sensing electrical current flowing through said separable contact means as a sensed current; and trip means employing the sensed current for tripping said operating means to the second state thereof to move said separable contact means to the open position thereof, said trip means including:

means for generating a first trip function of electrical current and time, means for generating a second trip function of electrical current and time, means for inputting the first interlock signal from said downstream electrical switching device, means for generating and outputting a second interlock signal to said upstream electrical switching device in response to both of the first and second trip functions, and means for selectively tripping said operating means as a function of the first interlock signal, the first trip function, and the second trip function.

2. The electrical switching apparatus as recited in claim 1 wherein said electrical current includes a ground current and a phase current; wherein said means for sensing includes means for sensing the ground current as a sensed ground current, and means for sensing the phase current as a sensed phase current; wherein said means for generating the first trip function employs the sensed ground current to generate the first trip function as a ground fault trip function; and wherein said means for generating the second trip function employs the sensed phase current to generate the second trip function as a short delay trip function.

3. The electrical switching apparatus as recited in claim 2 wherein said electrical current includes at least one of a ground fault current and a phase fault current; wherein the ground fault trip function employs a ground fault magnitude of electrical current and a first time period; wherein the short delay trip function employs a short delay magnitude of electrical current and a second time period; and wherein said means for generating and Outputting the second interlock signal includes means for asserting said signal: (a) when the ground fault current exceeds the ground fault magnitude, or (b) when the phase fault current exceeds the short delay fault magnitude.

4. The electrical switching apparatus as recited in claim 3 wherein said trip means employs a rated current value of said electrical current; and wherein said means for asserting said signal includes means for asserting said signal when the phase fault current is greater than two times the rated current value.

5. The electrical switching apparatus as recited in claim 2 wherein the ground fault trip function employs a ground fault pickup magnitude of electrical current and a first time period; and wherein the short delay trip function employs a short delay fault pickup magnitude of electrical current and a second time period.

6. The electrical switching apparatus as recited in claim 5 wherein said means for selectively tripping said operating means trips said operating means after either the sensed ground current exceeds the ground fault pickup magnitude, or the sensed phase current exceeds the short delay fault pickup magnitude, when said first interlock signal has said second value.

7. The electrical switching apparatus as recited in claim 5 wherein said means for selectively tripping said operating means trips said operating means when either the sensed ground current exceeds the ground fault pickup magnitude and the first time period of the ground fault trip function is exceeded, or the sensed phase current exceeds the short delay fault pickup magnitude and the second time period of the short delay trip function is exceeded, when said first interlock signal has said first value.

8. The electrical switching apparatus as recited in claim 5 wherein said means for selectively tripping said operating means disregards the first interlock signal when the sensed ground current is less than the ground fault pickup magnitude and the sensed phase current is less than the short delay fault pickup magnitude.

9. A circuit breaker for connection with at least one of an upstream circuit switching device and a downstream circuit switching device having means for generating a first interlock signal with a first value when current through the downstream device exceeds a predetermined value and with a second value otherwise, said circuit breaker comprising:

separable contact means for movement between a closed position and an open position;

operating means for moving said separable contact means between the closed position and the open position thereof, said operating means having a first state and a second state which corresponds to the open position of said separable contact means;

means for sensing electrical current flowing through said separable contact means as a sensed current; and trip means employing the sensed current for tripping said operating means to the second state thereof to move said separable contact means to the open position thereof, said trip means including:

means for generating a first trip function employing a first magnitude of electrical current and a first time period, means for generating a second trip function employing a second magnitude of electrical current and a second time period, means for inputting the first interlock signal from said downstream electrical switching device, means for generating and outputting a second interlock signal to said upstream electrical switching device in response to both of the first and second trip functions, means for selectively tripping said operating means, when the first interlock signal has the first value, as a function of the first magnitude and the first time period of the first trip function, and as a function of the second magnitude and the second time period of the second trip function, and means for selectively tripping said operating means, when the first interlock signal has the second value, as a function of the first magnitude of the first trip function or the second magnitude of the second trip function.

10. The circuit breaker as recited in claim 9 wherein said electrical current includes a ground current and a phase current; wherein said means for sensing includes means for sensing the ground current as a sensed ground current, and means for sensing the phase current as a sensed phase current; wherein said means for generating the first trip function employs the sensed ground current to generate the first trip function as a ground fault trip function; and wherein said means for generating the second trip function employs the sensed phase current to generate the second trip function as a short delay trip function.

11. The circuit breaker as recited in claim 10 wherein said means for generating the first trip function includes means for disabling the ground fault trip function.

12. The circuit breaker as recited in claim 10 wherein said electrical current includes at least one of a ground fault current and a phase fault current; wherein the first magnitude of the ground fault trip function is a ground fault magnitude and the second magnitude of the short delay trip function is a short delay fault magnitude; and wherein said means for generating and outputting the second interlock signal includes means for asserting said signal: (a) when the ground fault current exceeds the ground fault magnitude, or (b) when the phase fault current exceeds the short delay fault magnitude.

13. The circuit breaker as recited in claim 10 wherein the first magnitude of the ground fault trip function is a ground fault pickup magnitude and the second magnitude of the short delay trip function is a short delay fault pickup magnitude; and wherein said means for selectively tripping said operating means, when the first interlock signal has the second value, trips said operating means after either the sensed ground current exceeds the ground fault pickup magnitude, or the sensed phase current exceeds the short delay fault pickup magnitude.

14. The circuit breaker as recited in claim 10 wherein the first magnitude of the ground fault trip function is a ground fault pickup magnitude and the second magnitude of the short delay trip function is a short delay fault pickup magnitude; and wherein said means for selectively tripping said operating means, when the first interlock signal has the first value, trips said operating means when either the sensed ground current exceeds the ground fault pickup magnitude and the first time period of the ground fault trip function is exceeded, or the sensed phase current exceeds the short delay fault pickup magnitude and the second time period of the short delay trip function is exceeded.

15. The circuit breaker as recited in claim 14 wherein said means for selectively tripping said operating means, when the first interlock signal has the first value, disregards the first interlock signal when the sensed ground current is less than the ground fault pickup magnitude and the sensed phase current is less than the short delay fault pickup magnitude.

16. A system of electrical switching apparatus comprising:

a first electrical switching apparatus; and at least one second electrical switching apparatus, each of said electrical switching apparatus comprising:
  separable contact means for movement between a closed position and an open position;
  operating means for moving said separable contact means between the closed position and the open position thereof, said operating means having a first state and a second state which corresponds to the open position of said separable contact means;
  means for sensing electrical current flowing through said separable contact means as a sensed current; and
  trip means employing the sensed current for tripping said operating means to the second state thereof to move said separable contact means to the open position thereof, said trip means including:
    means for generating a first trip function of electrical current and time, and
    means for generating a second trip function of electrical current and time,
  said trip means of a downstream one of said first and second electrical switching apparatus further including means for generating a first interlock signal with a first value when current through said downstream one of said first and second electrical switching apparatus exceeds a predetermined value and with a second value otherwise, and
  said trip means of an upstream one of said first and second electrical switching apparatus further including:
    means for inputting the first interlock signal from said downstream one of said first and second electrical switching apparatus, and
    means for selectively tripping said operating means of said upstream one of said first and second electrical switching apparatus as a function of said first interlock signal of said downstream one of said first and second electrical switching apparatus, and both of the first and second trip functions of said upstream one of said first and second electrical switching apparatus.

17. The system as recited in claim 16 wherein said first trip function is a ground fault trip function and said second trip function is a short delay trip function.

18. The system as recited in claim 16 wherein said first electrical switching apparatus is a downstream apparatus; wherein said at least one second electrical switching apparatus includes an intermediate apparatus and an upstream apparatus; wherein said means for inputting the first interlock signal includes a first terminal for the first interlock signal; wherein said trip means of said intermediate apparatus further includes means for inputting the first interlock signal from said downstream apparatus, and means for generating and outputting a second interlock signal to said upstream apparatus in response to both of the first and second trip functions of said intermediate apparatus; and wherein said means for generating and outputting the second interlock signal includes a second terminal for the second interlock signal.

19. The system as recited in claim 18 wherein said means for generating and outputting the second interlock signal and said means for inputting the first interlock signal both include means for establishing a common ground for said interlock signals.

* * * * *